(12) United States Patent  
Ding et al.

(10) Patent No.: US 11,551,364 B2  
(45) Date of Patent: Jan. 10, 2023

(54) MULTI-TARGET TRACKING METHOD AND RELATED DEVICE

(71) Applicant: Shenzhen Intellifusion Technologies Co., Ltd., Guangdong (CN)

(72) Inventors: Xu Ding, Guangdong (CN); Wenze Hu, Guangdong (CN)

(73) Assignee: Shenzhen Intellifusion Technologies Co., Ltd., Guangdong (CN)

( * ) Notice: Subject to any disclaimer, the term of this patent is extended or adjusted under 35 U.S.C. 154(b) by 0 days.

(21) Appl. No.: 17/623,878

(22) PCT Filed: Aug. 14, 2020

(86) PCT No.: PCT/CN2020/109061  
§ 371 (c)(1),  
(2) Date: Dec. 30, 2021

(87) PCT Pub. No.: WO2021/057315  
PCT Pub. Date: Apr. 1, 2021

(65) Prior Publication Data  
US 2022/0319020 A1 Oct. 6, 2022

(30) Foreign Application Priority Data

Sep. 27, 2019 (CN) .......................... 201910931119.3

(51) Int. Cl.  
*G06K 9/00* (2022.01)  
*G06T 7/246* (2017.01)  
(Continued)

(52) U.S. Cl.  
CPC ................ *G06T 7/248* (2017.01); *G06T 3/40* (2013.01); *G06T 7/74* (2017.01); *G06T 7/90* (2017.01);  
(Continued)

(58) Field of Classification Search  
CPC .. G06T 7/248; G06T 7/74; G06T 7/90; G06T 3/40; G06T 11/00; G06T 2207/10016;  
(Continued)

(56) References Cited

U.S. PATENT DOCUMENTS 10,970,849 B2 * 4/2021 Öztireli ..................... G06T 7/70  
2020/0334828 A1 * 10/2020 Öztireli ................... G06F 3/011

FOREIGN PATENT DOCUMENTS

CN 106023242 A 10/2016

OTHER PUBLICATIONS

Zhao, Zijian, et al. "Real-time surgical instrument detection in robot-assisted surgery using a convolutional neural network cascade." Healthcare technology letters 6.6 (2019): 275-279. (Year: 2019).*

(Continued)

*Primary Examiner* — Jonathan S Lee

(57) ABSTRACT

A multi-target tracking method includes: obtaining a first image and a second image including N tracking targets from the same target video file, and obtaining N first tracking boxes of the first image that precedes a preset number of frames of the second image, the N first tracking boxes configured to frame the N tracking targets in the first image; superposing and synthesizing the first second images to obtain a target image; inputting the target image into an hourglass network model for feature extraction, to output a target feature map; inputting the target feature map into a prediction network to output a thermodynamic diagram, a width and height value set, a minor deviation value set, and a feature vector set; determining N second tracking boxes  
(Continued)

configured to frame N tracking targets in the second image, based on the thermodynamic diagram, the above three sets, and the N first tracking boxes.

9 Claims, 5 Drawing Sheets

(51) Int. Cl.
    *G06T 7/73*     (2017.01)
    *G06T 7/90*     (2017.01)
    *G06T 3/40*     (2006.01)
    *G06T 11/00*     (2006.01)
    *G06V 10/77*     (2022.01)

(52) U.S. Cl.
    CPC .......... *G06T 11/00* (2013.01); *G06V 10/7715* (2022.01); *G06T 2207/10016* (2013.01); *G06T 2207/10024* (2013.01); *G06T 2207/20081* (2013.01); *G06T 2207/20084* (2013.01); *G06T 2210/12* (2013.01); *G06V 2201/07* (2022.01)

(58) Field of Classification Search
    CPC . G06T 2207/10024; G06T 2207/20081; G06T 2207/20084; G06T 2210/12; G06V 10/7715; G06V 2201/07
    USPC .......................................................... 382/103
    See application file for complete search history.

(56) References Cited

OTHER PUBLICATIONS

Gao, Peng, et al. "Siamese attentional keypoint network for high performance visual tracking." Knowledge-based systems 193 (2020): 105448. (Year: 2020).*

Zhou, Xingyi, Dequan Wang, and Philipp Krähenbühl. "Objects as points." arXiv preprint arXiv:1904.07850 (2019). (Year: 2019).*

Li, Rui-Qi, et al. "A two-stage framework for real-time guidewire endpoint localization." International Conference on Medical Image Computing and Computer-Assisted Intervention. Springer, Cham, 2019. (Year: 2019).*

Li, Huimin. "Vector Hourglass Network for Human Pose Estimation based on Deep Learning." 2019 IEEE 2nd International Conference on Automation, Electronics and Electrical Engineering (AUTEEE). IEEE, 2019. (Year: 2019).*

Murthy, J. Krishna, Sarthak Sharma, and K. Madhava Krishna. "Shape priors for real-time monocular object localization in dynamic environments." 2017 IEEE/RSJ International Conference on Intelligent Robots and Systems (IROS). IEEE, 2017. (Year: 2017).*

Newell, Alejandro, Kaiyu Yang, and Jia Deng. "Stacked hourglass networks for human pose estimation." European conference on computer vision. Springer, Cham, 2016. (Year: 2016).*

* cited by examiner

MULTI-TARGET TRACKING METHOD AND RELATED DEVICE

CROSS-REFERENCE TO RELATED APPLICATION

This application claims the benefit of priority from Chinese Patent Application No. 201910931119.3, entitled "MULTI-TARGET TRACKING METHOD AND RELATED DEVICE" and filed on Sep. 27, 2019, the content of which is hereby incorporated by reference in its entirety.

BACKGROUND

Technical Field

The present disclosure generally relates to the technical field of electronics, and especially relates to a multi-target tracking method and a related device.

Description of Related Art

Target tracking is a key technology in the field of image processing and video processing. The target tracking is configured to identify a tracking target in videos or images, and is widely used in intelligent transportation, human-computer interaction, national defense investigation and other related fields. At present, a model used for tracking a target is a convolutional neural network (CNN) model that only uses an image of a first frame as a convolution kernel. When only the tracking target changes rather than the convolution kernel, accuracy of subsequent calculation is affected.

SUMMARY

The present disclosure relates to a multi-target tracking method and a related device which can improve accuracy of target tracking.

In a first aspect, a multi-target tracking method according to an embodiment of the present disclosure is applied to an electronic device and includes:

obtaining a first image and a second image from the same target video file, and obtaining N first tracking boxes of the first image; wherein the first image is an image that precedes the second image by a preset number of frames, each of the first image and the second image including N tracking targets, the N first tracking boxes configured to frame the N tracking targets of the first image, and N is an integer greater than 1;

superimposing and synthesizing the first image and the second image, to obtain a target image;

inputting the target image into an hourglass network model for feature extraction, to output a target feature map;

inputting the target feature map into a prediction network, to output a thermodynamic diagram, a width and height value set, a minor deviation value set and a feature vector set; and determining N second tracking boxes based on the thermodynamic diagram, the width and height value set, the minor deviation value set, the feature vector set and the N first tracking boxes; wherein the N second tracking boxes are configured to frame the N tracking targets of the second image.

In a second aspect, a multi-target tracking device according to an embodiment of the present disclosure is applied to an electronic device and includes:

an information obtaining unit configured to obtain a first image and a second image from the same target video file, and obtain N first tracking boxes of the first image; wherein the first image is an image that precedes the second image by a preset number of frames, each of the first image and the second image including N tracking targets, the N first tracking boxes configured to frame the N tracking targets of the first image, and N is an integer greater than 1;

an image synthesis unit configured to superimpose and synthesize the first image and the second image, to obtain a target image;

a feature extraction unit configured to input the target image into an hourglass network model for feature extraction, to output a target feature map;

a data determination unit configured to input the target feature map into a prediction network, to output a thermodynamic diagram, a width and height value set, a minor deviation value set and a feature vector set; and a tracking unit configured to determine N second tracking boxes based on the thermodynamic diagram, the width and height value set, the minor deviation value set, the feature vector set and the N first tracking boxes; wherein the N second tracking boxes are configured to frame the N tracking targets of the second image.

In a third aspect, an electronic device according to an embodiment of the present disclosure includes a processor, a memory, a communication interface, and one or more programs stored in the memory and configured to be executed by the processor; the one or more programs include instructions to implement some or all steps of the multi-target tracking method which is described in the first aspect.

In a fourth aspect, a computer readable storage medium is configured to store computer programs for electronic data interchange performed by a computer to implement some or all steps of the multi-target tracking method which is described in the first aspect.

In a fifth aspect, a computer program product according to an embodiment of the present disclosure includes a non-transient computer readable storage medium. The non-transient computer readable storage medium is configured to store computer programs performed by a computer to implement some or all steps of the multi-target tracking method which is described in the first aspect. The computer program product can be a software installation package.

It can be seen that, in the embodiment of the present disclosure, firstly, synthesizing the first image and the second image into the target image, wherein the first image and the second image are from the same video file, and the first image is the previous preset frame image of the second image; then inputting the target image into the hourglass network model, to obtain the target feature map, inputting the target feature map into the prediction network, to obtain the thermodynamic diagram, the width and height value set, the minor deviation value set, and the feature vector set. Finally, determining the second tracking box based on the thermodynamic diagram, the width and height value set, the minor deviation value set, the feature vector set, and the first tracking box, wherein the first tracking box is configured to frame the N tracking targets of the first image, and the second tracking box is configured to frame the N tracking targets of the second image. Therefore, the target can be tracked, based on a combination of a certain image, a previous preset frame image of the certain image, and a tracking box associated with the previous preset frame image, so that the tracking can be changed along with the change of the tracking target, and the accuracy of the target tracking can be further improved.

These or other aspects of the present disclosure can be more readily apparent from the following description of the embodiments.

BRIEF DESCRIPTION OF THE DRAWINGS

In order to more clearly understand the technical solution hereinafter in embodiments of the present disclosure, a brief description to the drawings used in detailed description of embodiments hereinafter is provided thereof. Obviously, the drawings described below are some embodiments of the present disclosure, for one of ordinary skill in the related art, other drawings can be obtained according to the drawings below on the premise of no creative work.

DETAILED DESCRIPTION

Electronic devices can include various devices with wireless communication functions, such as handheld devices, on-board devices, wearable devices, computing devices or other processing devices connected to wireless modems, as well as various forms of a user equipment (UE), a mobile station (MS), a terminal device, etc.

Figure 1A:
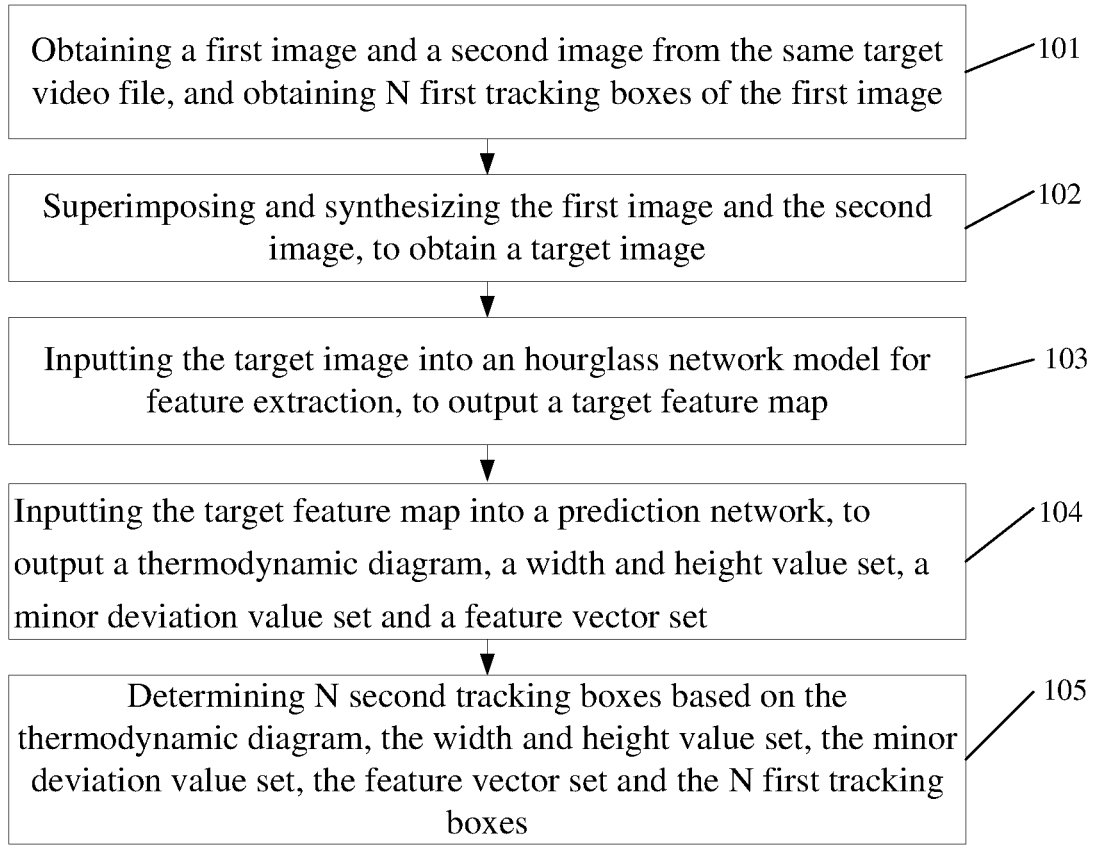
FIG. 1A is a flowchart of a multi-target tracking method in accordance with an embodiment of the present disclosure.

Referring to FIG. 1A, a multi-target tracking method according to an embodiment of the present disclosure is applied to an electronic device, and specifically includes the following steps:

step 101, obtaining a first image and a second image from the same target video file, and obtaining N first tracking boxes of the first image; wherein the first image is an image that precedes the second image by a preset number of frames, each of the first image and the second image including N tracking targets, the N first tracking boxes configured to frame the N tracking targets of the first image, and N is an integer greater than 1.

The step of obtaining the N first tracking boxes of the first image, includes: obtaining first widths of the N first tracking boxes, first heights of the N first tracking boxes, first positions of the N first tracking boxes, and feature vectors of first center points of the N first tracking boxes.

A size of the first image is the same as that of the second image, i.e. a width and a height. Each of the first image and the second image is an image that includes the N tracking targets, that is, each of the first image and the second image displays the N tracking targets. For example, if four tracking targets are displayed in the first image, and the four tracking targets are 1, 2, 3 and 4, the tracking targets 1, 2, 3 and 4 are also displayed in the second image.

The previous preset frame image is, for example, a previous frame image, a previous two frames of images, a previous four frames of images, and a previous five frames of images.

The target video file is a video file that follows the tracking target. The target video file is stored in the electronic device, or in the cloud, etc.

step 102, superimposing and synthesizing the first image and the second image, to obtain a target image.

Step 103, inputting the target image into an hourglass network model for feature extraction, to output a target feature map.

The target feature map includes M feature points of the N tracking targets, and M is a positive integer. The number of feature points of each tracking target can be the same or different, such as 8, 10, 13, 18 and other values. The feature points are configured to mark different positions of the tracking target. For example, it is assumed that the tracking target is a person, the feature points can be joint points of the person.

Step 104, inputting the target feature map into a prediction network, to output a thermodynamic diagram, a width and height value set, a minor deviation value set and a feature vector set.

Step 105, determining N second tracking boxes based on the thermodynamic diagram, the width and height value set, the minor deviation value set, the feature vector set and the N first tracking boxes, wherein the N second tracking boxes are configured to frame the N tracking targets of the second image.

In an implementation of the present disclosure, after the step 205, the method further includes: the electronic device displays the N second tracking boxes on the second image.

A shape of the first tracking box is the same as the second tracking box, which can be rectangular, square, diamond, circular or other shapes.

The width of the first image is greater than that of the N first tracking boxes, and the height of the first image is greater than that of the N first tracking boxes; the width of the second image is greater than that of the N second tracking boxes, and the height of the second image is greater than that of the N second tracking boxes.

An overlapping portion can be formed between every two adjacent first tracking boxes of the N first tracking boxes, and so does the N second tracking boxes.

It can be seen that, in the embodiment of the present disclosure, firstly, synthesizing the first image and the second image into the target image, wherein the first image and the second image are from the same video file, and the first image is the previous preset frame image of the second image; then inputting the target image into the hourglass network model, to obtain the target feature map, inputting the target feature map into the prediction network, to obtain the thermodynamic diagram, the width and height value set, the minor deviation value set, and the feature vector set. Finally, determining the second tracking box based on the thermodynamic diagram, the width and height value set, the minor deviation value set, the feature vector set, and the first tracking box, wherein the first tracking box is configured to frame the N tracking targets of the first image, and the second tracking box is configured to frame the N tracking targets of the second image. Therefore, the target can be tracked, based on a combination of a certain image, a previous preset frame image of the certain image, and a tracking box associated with the previous preset frame image, so that the tracking can be changed along with the change of the tracking target, and the accuracy of the target tracking can be further improved.

In an implementation of the present disclosure, the step of superimposing and synthesizing the first image and the second image, to obtain the target image, includes:

determining a first color channel of the first image, and a second color channel of the second image; and synthesizing the target image by superimposing the first color channel and the second color channel.

The electronic device determines that the first color channel and the second color channel can be determined in parallel or in series, which is not limited here.

Specifically, each of the first image and the second image is composed of a red channel, a green channel, and a blue channel. The electronic device performs image processing on the first image, to obtain the first color channel of the first image (namely, the red channel, the green channel and the blue channel of the first image). The electronic device performs image processing on the second image, to obtain the second color channel of the second image (namely, the red channel, the green channel and the blue channel of the second image). The electronic device merges the red channel of the first image and the red channel of the second image, merges the green channel of the first image and the green channel of the second image, and merges the blue channel of the first image and the blue channel of the second image, to obtain the target image with two red channels, two green channels, and two blue channels.

It can be seen that, in the embodiment of the present disclosure, by merging two images into one multi-color channel image, computational amount and calculation resources that are required in the hourglass model can be reduced, thereby the calculation efficiency can be improved.

In an implementation of the present disclosure, the hourglass network model is formed by sequentially arranging i hourglass networks, wherein an input image of an i-th hourglass network is an image obtained by synthesizing an input image and an output image of a (i−1)-th hourglass network, and i is an integer greater than or equal to 2;

a first processing is performed every time when passing through one of the hourglass networks, wherein, in the first processing, the input image is down-sampled through a plurality of first convolution blocks of the hourglass network, to output a first feature map; the first feature map is up-sampled through a plurality of second convolution blocks of the hourglass network, to output a second feature map; superimposing the second feature map with the input image, to output a third feature map.

The first convolution block is a first convolutional neural network, and the second convolution block is a second convolutional neural network. The first convolutional neural network and the second convolutional neural network have different functions.

Figure 1B:
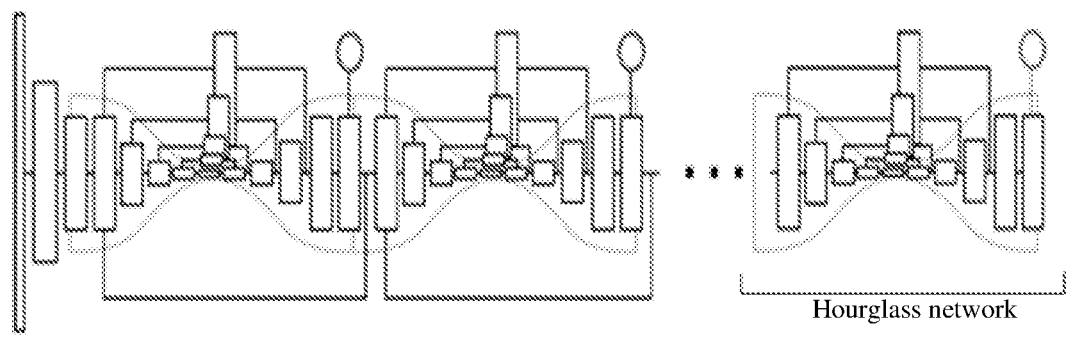
FIG. 1B is a schematic view of an hourglass network model in accordance with an embodiment of the present disclosure.

The hourglass network model can be composed of 2 hourglass networks, 4 hourglass networks, 5 hourglass networks, 7 hourglass networks, or other numbers of hourglass networks arranged in sequence. Referring to FIG. 1B, a structural diagram of the hourglass network model is shown. When the hourglass network model is composed of two hourglass networks, not only the calculation accuracy can be ensured, but also a calculation speed can be improved.

An input image of a first hourglass network in the hourglass network model is the target image, and a feature map output by the last hourglass network in the hourglass network model is the target feature map.

Referring to FIG. 1B, each hourglass network is a symmetrical network and can be performed down-sampling and up-sampling. The down-sampling is first performed, and the up-sampling is then performed. The number of times that the up-sampling of each hourglass network is performed, is the same as that of the down-sampling, such as 4 times, 6 times, 7 times, and other values. The nearest proximity interpolation technology is used in the down-sampling for reducing a resolution of an image, and a technique of maximum pooling or average pooling is used in the up-sampling uses for improving a resolution of a picture.

In an embodiment of the present disclosure, a hourglass network a is not a first hourglass network arranged in the hourglass network model, and an input image of the hourglass network a that is performed the down-sampling for the first time is an image 1 (the image 1 is obtained by synthesizing an input image of an hourglass network b and an output image of the hourglass network b, and in the hourglass network model, the hourglass network a is arranged adjacent to the hourglass network b and is positioned behind the hourglass network b.) An input image of the hourglass network a that is performed a next down-sampling, is an output image of a previous down-sampling; a resolution of the output image, that the hourglass network a is performed the next down-sampling, is shorten to a half, based on a resolution of the input image that the hourglass network a is performed the next down-sampling. An input image of the hourglass network a that is performed the first up-sampling, is an output image of the hourglass network a that is performed the last down-sampling; the input image of the hourglass network a performed the next up-sampling is superimposed and synthesized by an output image of a previous up-sampling and an output image of a symmetrical down-sampling; and a resolution of the output image, that the hourglass network a is performed the next up-sampling, is doubled, based on a resolution of the input image that the hourglass network a is performed the next up-sampling.

The input image that the first hourglass network of the hourglass network model firstly performs the down-sampling, is the target image, and a specific implementation that the first hourglass network of the hourglass network model performs the up-sampling and the down-sampling, is the same as that of the hourglass network a, which is described in detail above, and isn't described here again.

For example, it is assumed that the number of the up-sampling and the down-sampling of the hourglass network a is 4, the image 1 is 6×128×128, wherein, 6 is the number of channels, 128×128 is the resolution of the image 1, performing the first down-sampling on the image 1 by using a proximity interpolation method, to output an image 2 with a resolution of 6×64×64, performing a second down-sampling on the image 2 to output an image 3 with a resolution of 6×32×32, performing a third down-sampling on the image 3 to output an image 4 with a resolution of 6×16×16, and performing a fourth down-sampling on the image 4 to output an image 5 with a resolution of 6×8×8. After four times of the down-sampling is completed, the up-sampling is performed on the image 5 by the average pooling. Performing a first up-sampling on the image 5, to output an image 6 with a resolution of 6×16×16, merging the image 6 with the image 4 output by the third down-sampling as the input image of a second up-sampling, and then performing the second up-sampling to output an image 7 with a resolution of 6×32×32, merging the image 7 with the image 3 as the input image of a third up-sampling, and then performing the third up-sampling to output an image 8 with a resolution of 6×64×64, finally, merging the image 8 with the image 2 as the input of a fourth up-sampling, and then performing the fourth up-sampling to output an image 9 with a resolution of 6×128×128.

It can be seen that, in the embodiment of the present disclosure, a plurality of down-sampling and a plurality of up-sampling is performed by each hourglass network, so that features of different areas in the target image can be extracted, a spatial relationship among the feature points of the target image can be reserved, and the probability of identifying and tracking the target image can be improved.

In an implementation of the present disclosure, the prediction network includes a thermodynamic diagram branch, a width and height branch, a minor deviation branch and a feature vector branch. The step of inputting the target feature map into the prediction network, to output the thermodynamic diagram, the width and height value set, the minor deviation value set and the feature vector set, including:

inputting the target feature map into the thermodynamic diagram branch, to output the thermodynamic diagram;

inputting the target feature map into the width and height branch, to output the width and height value set; and inputting the target feature map into the minor deviation branch, to output the minor deviation value set; and inputting the thermodynamic diagram and the minor deviation value set into the feature vector branch, to output the feature vector set.

The step of inputting the target feature map into the width and height branch, to output the width and height value set, includes: inputting the target feature map, a first width of the N first tracking boxes and a first height of the N first tracking boxes into the width and height branch, to output the width and height value set.

The step of inputting the thermodynamic diagram and the minor deviation value set into the feature vector branch, to output the feature vector set, includes: inputting feature vectors of the thermodynamic diagram, the minor deviation value set and the first center point of the N first tracking boxes into the feature vector branch, to output the feature vector set.

The electronic device inputs the target feature map into the thermodynamic branch, inputs the target feature map into the width and height branch, and inputs the target feature map into the minor deviation branch, in parallel.

The electronic device trains a third convolution block by a first formula to obtain the thermodynamic diagram branch.

The first formula is:

$$SmoothL1Loss(o_k) = \begin{cases} 0.5o_k^2 & |o_k| < 1 \\ |o_k| - 0.5 & \text{Others} \end{cases}$$

wherein H is a height of the target feature map; W is a width of the target feature map; $P_{ij}$ is a probability that the feature point at a position (i, j) is the target feature point; $y_{ij}$ is a mark value of the feature point at the position (i, j) in the first image; the mark value is configured to indicate possibility of calculation errors occurred in the feature point corresponding to the mark value, when calculating the probability that the feature point at the position (i, j) is the target feature point. The greater the mark value is, the greater the possibility of calculation errors is, and the smaller the mark value is, the smaller the possibility of calculation errors is. The mark value is set by the electronic device when training the third convolution block. α and β are fixed values, and can be different under different conditions.

Figure 1C:
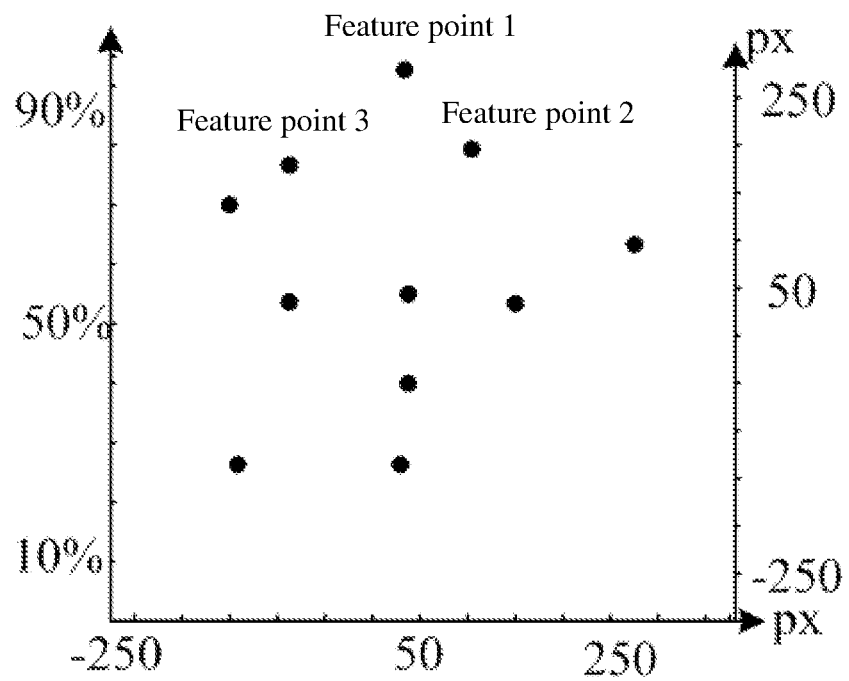
FIG. 1C is a block diagram of a thermodynamic diagram in accordance with an embodiment of the present disclosure.

The thermodynamic diagram is shown in FIG. 1C, points in FIG. 1C represent the feature points, the ordinate on the left of FIG. 1C represents the probability, and the abscissa and the ordinate on the right of FIG. 1C jointly represent the position of the feature point.

The electronic device trains a fourth convolution block by a second formula to obtain the width and height branch.

The second formula is:

$$L_2 = |f(x) - Y|^2$$

Wherein, Each of f(x) and Y is a width or a height, and $L_2$ is the square of a width difference or the square of a height difference.

The width and height value set includes a correspondence relationship between the width and the square of the width difference, and a correspondence relationship between the height and the square of the height difference, which are specifically shown in table 1.

TABLE 1

| Height (mm) | Square of height difference (mm²) | Width (mm) | Square of width difference (mm²) |
|---|---|---|---|
| h1 | H1 | k1 | K1 |
| h2 | H2 | k2 | k2 |
| ... | ... | ... | ... |

The electronic device trains a fifth convolution block by a third formula to obtain the minor deviation branch.

The third formula is:

$$L_{off} = \frac{1}{M} \sum_{k=1}^{M} SmoothL1Loss(o_k)$$

$$SmoothL1Loss(o_k) = \begin{cases} 0.5o_k^2 & |o_k| < 1 \\ |o_k| - 0.5 & \text{Others} \end{cases}$$

Wherein, M is the number of feature points included in the target feature map, and $o_k$ is an offset.

The third convolution block is a third convolutional neural network, the fourth convolution block is a fourth convolutional neural network, and the fifth convolution block is a fifth convolutional neural network. The third convolutional neural network, the fourth convolutional neural network and the fifth convolutional neural network have different functions.

The minor deviation value set includes a correspondence relationship between coordinate values and offsets, as shown in Table 2.

TABLE 2

| Coordinate value | Offset |
|---|---|
| 01 | 0.01 |
| 02 | 0.03 |
| 03 | 0.01 |
| ... | ... |

It should be noted that, when determining an offset of the target feature point on the horizontal axis relative to a position that the target feature point is in the target feature map, a coordinate value in Table 2 represents an abscissa value; when determining an offset of the target feature point on the longitudinal axis relative to a position that the target feature point is in the target feature map, the coordinate value in Table 2 represents an ordinate value.

The feature vector branch includes a first branch, a second branch and a third branch. The electronic device trains a sixth convolution block by a fourth formula to obtain the first branch, the electronic device trains a seventh convolution block by a fifth formula to obtain the second branch, and the electronic device trains an eighth convolution block by a sixth formula to obtain the third branch.

The sixth convolution block is a sixth convolutional neural network, the seventh convolution block is a seventh convolutional neural network, and the eighth convolution block is an eighth convolutional neural network. The sixth convolutional neural network, the seventh convolutional neural network and the eighth convolutional neural network have different functions.

The fourth formula is:

$$L_{pull} = \frac{1}{N}\sum_{k=1}^{N}[(e_{t_k} - e_k)^2 + (e_{b_k} - e_k)^2]$$

Wherein, $e_{b_k}$ is a feature vector of a first center point of any one first tracking box, $e_{t_k}$ is a feature vector of a second center point of the second tracking box corresponding to the any one first tracking box, and $e_k$ is a mean value of the feature vector of the first center point of the any one first tracking box, and the feature vector of the second center point of the second tracking box that is corresponding to the any one first tracking box.

The fifth formula is:

$$L_{push} = \frac{1}{N(N-1)}\sum_{\substack{k=1 \\ j \neq k}}^{N}\sum_{j=1}^{N}\max(0, \Delta - |e_k - e_j|)$$

Wherein, $e_k$ is a mean value of the feature vector of the first center point of one of the N first tracking boxes, and the feature vector of the second center point of the second tracking box corresponding to the one of the N first tracking boxes, $e_j$ is a mean value of the feature vector of the first center point of another first tracking box among the N first tracking boxes, and the feature vector of the second center point of the second tracking box corresponding to the another first tracking box among the N first tracking boxes. The delta $\Delta$ is 1.

The sixth formula is:

$$d_{12} = \|x_1 - x_2\|$$

Wherein, $x_1$ is the feature vector of the first center point, and $x_2$ is the feature vector of the second center point.

The feature vector set includes the feature vectors of the second center points of the N second tracking boxes, as shown in Table 3.

TABLE 3

| Second center point | Feature vector |
|---|---|
| (a1, b1) | c1 |
| (a2, b2) | 3c2 |
| (a3, b3) | 1.5c3 |
| . . . | . . . |

Wherein, the feature vector corresponding to a second center point (a1, b1) is c1, the feature vector corresponding to a second center point (a2, b2) is 3c2, and the feature vector corresponding to a second center point (a3, b3) is 1.5c3. c1, c2 and c3 are all basic solution systems, which can be the same or different.

It can be seen that, in the embodiment of the present disclosure, inputting the target feature map into the three branches is performed in parallel, so that the time required for convolution operation can be reduced, and the calculation efficiency can be further improved.

In an implementation of the present disclosure, the step of determining the N second tracking boxes based on the thermodynamic diagram, the width and height value set, the minor deviation value set, the feature vector set and the N first tracking boxes, includes:

determining second positions of N second center points based on the thermodynamic diagram, the minor deviation value set, the feature vector set and first positions of N first center points, wherein the N first center points are center points of the N first tracking boxes, the N second center points are center points of the N second tracking boxes, and the N first positions are in one-to-one correspondence with the N second positions; and determining a second height of the N second tracking boxes, and a second width of the N second tracking boxes based on the width and height value set, a first height of the N first tracking boxes, and a first width of the N first tracking boxes; wherein the second height of the N second tracking boxes is in one-to-one correspondence with the first height of the N first tracking boxes, and the second width of the N second tracking boxes is in one-to-one correspondence with the first width of the N first tracking boxes.

Specifically, the first height is known. The square of the height difference corresponding to the first height can be obtained through Table 1, and then the second height can be calculated based on the second formula. For example, it is assumed that the first height is C, and the square of the height difference corresponding to the first height is c, the second height is equal to $\sqrt{c} - C$.

The first width is known. The square of the width difference corresponding to the first width can be obtained through Table 1, and then the second width can be calculated based on the second formula. For example, it is assumed that the first width is D, and the square of the width difference corresponding to the first width is d, the second width is equal to $\sqrt{d} - D$.

In an implementation of the present disclosure, the target feature map includes M feature points, and M is a positive integer; the step of determining the second positions of the N second center points based on the thermodynamic diagram, the minor deviation value set, the feature vector set, and the first positions of the N first center points, including:

determining third positions of N target feature points in the target feature map based on the thermodynamic diagram, and determining offsets of the N target feature points based on the minor deviation value set, wherein the N target feature points are in one-to-one correspondence with the N first central points and the N second central points, the target feature point is a midpoint of a connection line between the corresponding first central point and the corresponding second central point, the M feature points including the N target feature points, and the offset configured to represent the corresponding target feature point shifted relative to a position that the corresponding target feature point is in the target feature map;

determining a first mapping relationship based on the N first positions, and the N third positions that have determined, the first mapping relationship configured to represent at least one target feature point corresponding to each first central point; and determining the second positions of the N second center points based on the feature vector set, the N first positions, the first mapping relationship, N offsets that have determined, and the N third positions.

Specifically, the probability that each feature point of the M feature points is a target feature point can be obtained through the thermodynamic diagram. Then, a previous N feature points with high probability among the M feature points are taken as the target feature points, so as to further obtain the first positions of the N target feature points. For example, referring to FIG. 1C, a feature point 1, a feature point 2 and a feature point 3 are three feature points with a high probability among all the feature points shown in FIG. 1C, in this way, when the thermodynamic diagram is as shown in FIG. 1C, the target feature points are the feature point 1, the feature point 2, and the feature point 3.

Through the minor deviation value set, the offset of the target feature point on the horizontal axis relative to the position that the target feature point is in the target feature map, and the offset of the target feature point on the longitudinal axis relative to the position that the target feature point is in the target feature map, can be obtained. For example, it is assumed that the feature point 1 is the target feature point, and the coordinate of the feature point 1 in FIG. 1C is (50, 300), the offset of the feature point 1 on the horizontal axis relative to the position that the target feature point is in the target feature map, and the offset of the feature point 1 on the longitudinal axis relative to the position that the target feature point is in the target feature map, can be seen from Table 2.

After the target feature map is converted into the thermodynamic diagram, a minor deviation is occurred in the target feature point, and then the offset is known, a specific position that the target feature point is in the target feature map can be obtained through the offset and the first position of the target feature point. For example, it is assumed that the feature point 1 is the target feature point, and the coordinate of the feature point 1 in FIG. 1C is (50, 300), the offset of the feature point 1 on the horizontal axis relative to the position that the target feature point 1 is in the target feature map is 0.02, and the offset of the feature point 1 on the longitudinal axis relative to the position that the target feature point 1 is in the target feature map is 0.1, therefore, a specific position of the feature point 1 in the target feature map is (50.02, 300.1).

Figure 1D:
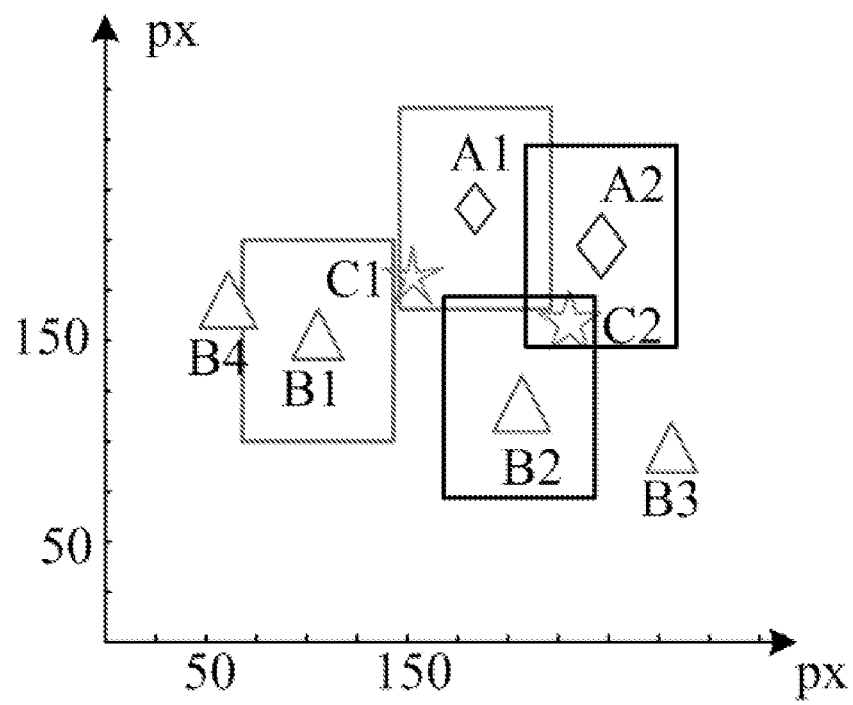
FIG. 1D is a schematic diagram of a feature vector set in accordance with an embodiment of the present disclosure.

The positions of the N second center points can be determined through the feature vector set. For example, as shown in FIG. 1D, both A1 and A2 are the first center points, and both C1 and C2 are the target feature points, a distance between C1 and C2 is very close, so that a correspondence relationship between A1 and C1, and a correspondence relationship between A2 and C2 can't be accurately determined, in this way, the following two situations occur: a second center point B1 is determined by A1 and C1, and a second center point B2 is determined by A2 and C2; or a second center point B3 is determined by A1 and C2, and a second center point B4 is determined by A2 and C1. It is assumed that the second center point B1 is determined by A1 and C1, and the second center point B2 is determined by A2 and C2, a distance between A1 and B1 is firstly shorten by the fourth formula, a distance between A1 and B2 is then widen by the fifth formula, and a distance A1B1 between A1 and B1 is finally calculated. It is assumed that the second center point B3 is determined by A1 and C2, and the second center point B4 is determined by A2 and C1, a distance between A1 and B3 is firstly shorten by the fourth formula, a distance between A1 and B4 is then widen by the fifth formula, and a distance A1B3 between A1 and B3 is finally calculated. Subsequently, comparing the distance A1B1 with the distance A1B3, if A1B1<A1B3, it is determined that B1 is the second center point corresponding to A1, and B2 is the second center point corresponding to A2; if A1B1>A1B3, it is determined that B3 is the second center point corresponding to A1, and B4 is the second center point corresponding to A2.

It can be seen that in the embodiment of the present disclosure, the position offset of the target feature point is adjusted by the minor deviation way, so that the tracking accuracy can be improved.

It should be noted that, FIG. 1B to FIG. 1D provided in the embodiments of the present disclosure are only for illustration, rather than constitute a limitation to the embodiments of the present disclosure.

Figure 2A:
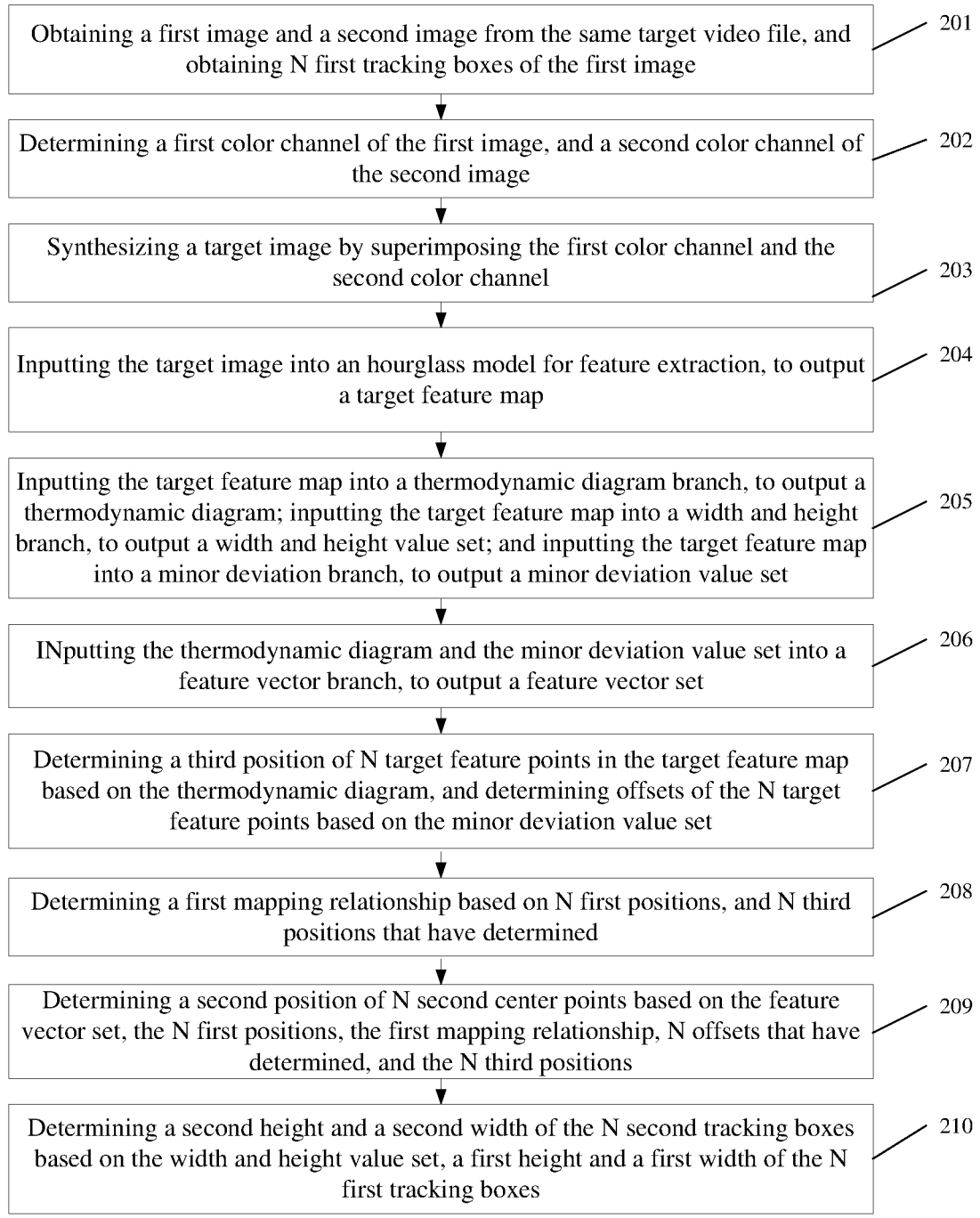
FIG. 2A is a flowchart of a multi-target tracking method in accordance with another embodiment of the present disclosure.

Consistent with the embodiment shown in FIG. 1A, referring to FIG. 2A, a flowchart of a multi-target tracking method in accordance with another embodiment of the present disclosure is shown. The multi-target tracking method is applied to an electronic device and specifically includes the following steps:

step 201, obtaining, by the electronic device, a first image and a second image from the same target video file, and obtaining N first tracking boxes of the first image; wherein the first image is an image that precedes the second image by a preset number of frames, each of the first image and the second image including N tracking targets, the N first tracking boxes configured to frame the N tracking targets of the first image, and N is an integer greater than 1.

step 202, determining, by the electronic device, a first color channel of the first image, and a second color channel of the second image.

step 203, synthesizing, by the electronic device, a target image by superimposing the first color channel and the second color channel.

step 204, inputting, by the electronic device, the target image into an hourglass model for feature extraction, to output a target feature map, wherein the target feature map includes M feature points and M is a positive integer.

step 205, inputting, by the electronic device, the target feature map into a thermodynamic diagram branch, to output a thermodynamic diagram, inputting the target feature map into a width and height branch, to output a width and height value set, and inputting the target feature map into a minor deviation branch, to output a minor deviation value set.

step 206, inputting, by the electronic device, the thermodynamic diagram and the minor deviation value set into a feature vector branch, to output a feature vector set.

step 207, determining, by the electronic device, third positions of N target feature points in the target feature map based on the thermodynamic diagram, and determining offsets of the N target feature points based on the minor deviation value set; wherein the N target feature points are in one-to-one correspondence with the N first central points and the N second central points, the target feature point is a midpoint of a connection line between the corresponding first central point and the corresponding second central point, the M feature points including the N target feature points, and the offset configured to represent the corresponding target feature point shifted relative to a position that the corresponding target feature point is in the target feature map;

step 208, determining, by the electronic device, a first mapping relationship based on the N first positions, and the N third positions that have determined, the first mapping relationship configured to represent at least one target feature point corresponding to each first central point, wherein the N first positions are in one-to-one correspondence with the N first central points.

step 209, determining, by the electronic device, the second positions of the N second center points based on the feature vector set, the N first positions, the first mapping relationship, N offsets that have determined, and the N third positions.

step 210, determining, by the electronic device, a second height and a second width of the N second tracking boxes based on the width and height value set, a first height and a first width of the N first tracking boxes, wherein the second height of the N second tracking boxes is in one-to-one correspondence with the first height of the N first tracking boxes, and the second width of the N second tracking boxes is in one-to-one correspondence with the first width of the N first tracking boxes.

Figure 2B:
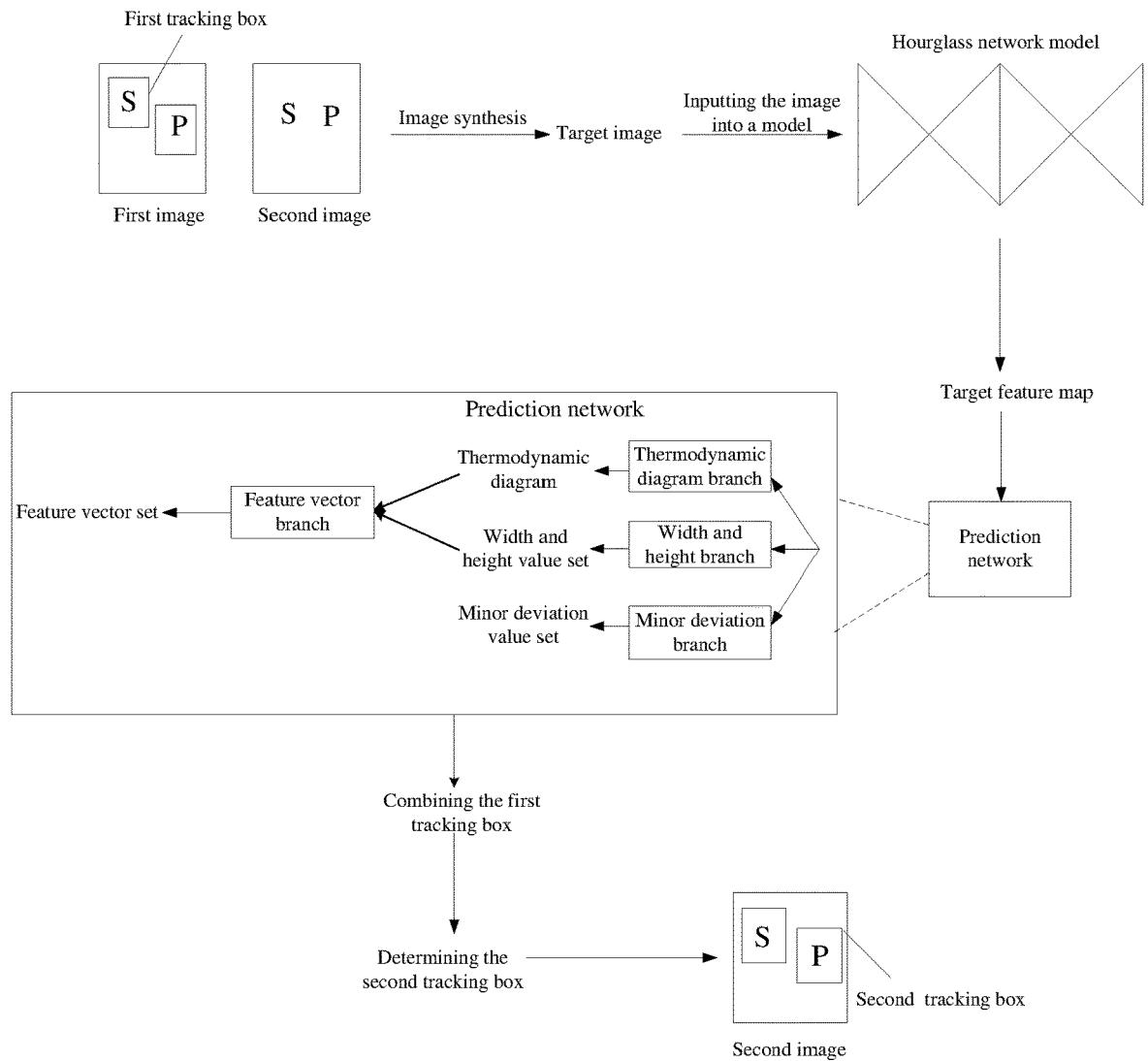
FIG. 2B is a block diagram of the multi-target tracking method of FIG. 1.

For example, as shown in FIG. 2B, the target image is obtained by performing image synthesis on two images that include a tracking target S and a tracking target P, and the target image is input into the hourglass network model, to output the target feature map after the target image passing the hourglass network model. And then, the target feature map is input into the thermodynamic diagram branch, the width and height branch and the minor deviation branch of the prediction network, respectively. After the target feature map passing the three branches, the thermodynamic diagram, the width and height value set and the minor deviation value set are output respectively. And then, the thermodynamic diagram and the minor deviation value set are input into the feature vector branch to output the feature vector set. Finally, the second tracking box is determined based on the first tracking box, the thermodynamic diagram, the width and height value set, the minor deviation value set and the feature vector set, so that the tracking target S can be selected through the second tracking box to track the target.

It should be noted that a specific implementation of the embodiment can be referred to the specific implementation described in the above embodiment, which is not described here.

Figure 3:
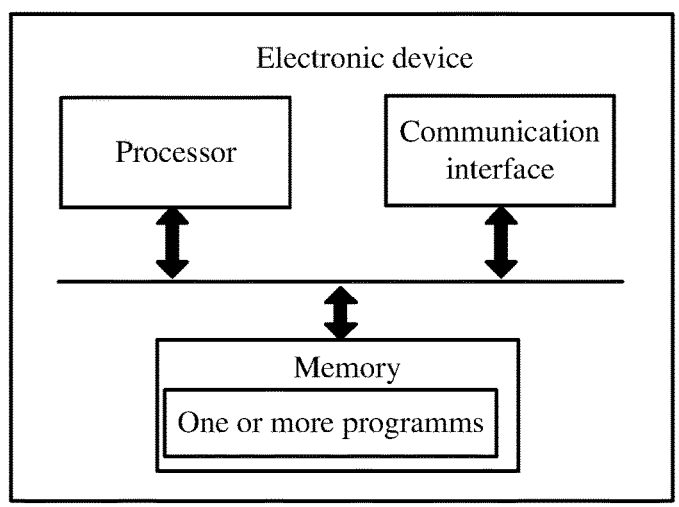
FIG. 3 is a block diagram of an electronic device in accordance with an embodiment of the present disclosure.

Consistent with the embodiment shown in FIG. 1A and FIG. 2A, referring to FIG. 3, a block diagram of an electronic device in accordance with an embodiment of the present disclosure is shown. The electronic device includes a processor, a memory, a communication interface, and one or more programs stored in the memory and performed by the processor. The one or more programs include instructions to implement the following steps:

obtaining a first image and a second image from the same target video file, and obtaining N first tracking boxes of the first image; wherein the first image is an image that precedes the second image by a preset number of frames, each of the first image and the second image including N tracking targets, the N first tracking boxes configured to frame the N tracking targets of the first image, and N is an integer greater than 1;

superimposing and synthesizing the first image and the second image, to obtain a target image;

inputting the target image into an hourglass network model for feature extraction, to output a target feature map;

inputting the target feature map into a prediction network, to output a thermodynamic diagram, a width and height value set, a minor deviation value set and a feature vector set; and determining N second tracking boxes based on the thermodynamic diagram, the width and height value set, the minor deviation value set, the feature vector set and the N first tracking boxes; wherein the N second tracking boxes are configured to frame the N tracking targets of the second image.

In an implementation of the present disclosure, the prediction network includes a thermodynamic diagram branch, a width and height branch, a minor deviation branch and a feature vector branch; the step of inputting the target feature map into the prediction network, to output the thermodynamic diagram, the width and height value set, the minor deviation value set and the feature vector set, including:

inputting the target feature map into the thermodynamic diagram branch, to output the thermodynamic diagram;
inputting the target feature map into the width and height branch, to output the width and height value set; and
inputting the target feature map into the minor deviation branch, to output the minor deviation value set; and
inputting the thermodynamic diagram and the minor deviation value set into the feature vector branch, to output the feature vector set.

In an implementation of the present disclosure, in terms of determining the N second tracking boxes based on the thermodynamic diagram, the width and height value set, the minor deviation value set, the feature vector set and the N first tracking boxes, the programs include the instructions specifically configured to perform the following steps:

determining second positions of N second center points based on the thermodynamic diagram, the minor deviation value set, the feature vector set and first positions of N first center points, wherein the N first center points are center points of the N first tracking boxes, the N second center points are center points of the N second tracking boxes, and the N first positions are in one-to-one correspondence with the N second positions; and determining a second height of the N second tracking boxes and a second width of the N second tracking boxes based on the width and height value set, a first height of the N first tracking boxes, and a first width of the N first tracking boxes; wherein the second height of the N second tracking boxes is in one-to-one correspondence with the first height of the N first tracking boxes, and the second width of the N second tracking boxes is in one-to-one correspondence with the first width of the N first tracking boxes.

In an implementation of the present disclosure, the target feature map includes M feature points, and M is a positive integer; in terms of determining the second positions of the N second center points based on the thermodynamic diagram, the minor deviation value set, the feature vector set, and the first positions of N the first center points, the programs include the instructions specifically configured to perform the following steps:

determining third positions of N target feature points in the target feature map based on the thermodynamic diagram, and determining offsets of the N target feature points based on the minor deviation value set, wherein the N target feature points are in one-to-one correspondence with the N first central points and the N second central points, the target feature point is a midpoint of a connection line between the corresponding first central point and the corresponding second central point, the M feature points including the N target feature points, and the offset configured to represent the corresponding target feature point shifted relative to a position that the corresponding target feature point is in the target feature map;

determining a first mapping relationship based on the N first positions, and the N third positions that have determined, the first mapping relationship configured to represent at least one target feature point corresponding to each first central point; and determining the second positions of the N second center points based on the feature vector set, the N first positions, the first mapping relationship, N offsets that have determined, and the N third positions.

In an implementation of the present disclosure, in terms of superimposing and synthesizing the first image and the second image, to obtain the target image, the programs include the instructions specifically configured to perform the following steps:

determining a first color channel of the first image and a second color channel of the second image; and synthesizing the target image by superimposing the first color channel and the second color channel.

In an implementation of the present disclosure, the hourglass network model is formed by sequentially arranging i hourglass networks, wherein an input image of an i-th hourglass network is an image obtained by synthesizing an input image and an output image of a (i−1)-th hourglass network, and i is an integer greater than or equal to 2;

performing a first processing every time when passing through one of the hourglass networks, wherein, in the first processing, the input image is down-sampled through a plurality of first convolution blocks of the hourglass network, to output a first feature map; the first feature map is up-sampled through a plurality of second convolution blocks of the hourglass network, to output a second feature map; superimposing the second feature map and the input image, to output a third feature map.

It should be noted that a specific implementation of the embodiment can be referred to the specific implementation described in the above embodiment, which is not described here.

Figure 4:
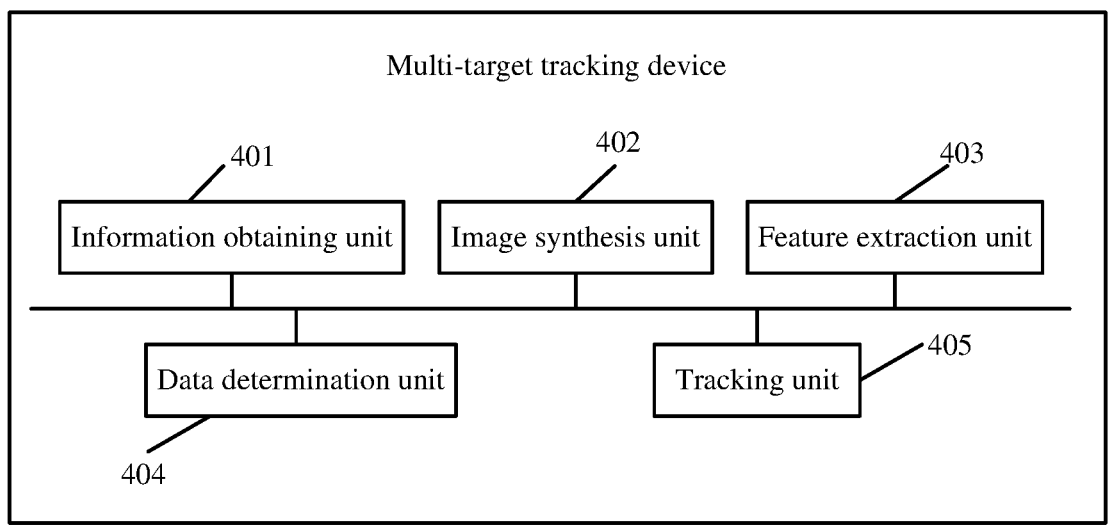
FIG. 4 is a block diagram of a multi-target tracking device in accordance with an embodiment of the present disclosure.

Referring to FIG. 4, a multi-target tracking device in accordance with an embodiment of the present disclosure is applied to the above electronic device, and includes:

an information obtaining unit 401 configured to obtain a first image and a second image from the same target video file, and obtain N first tracking boxes of the first image; wherein the first image is an image that precedes the second image by a preset number of frames, each of the first image and the second image including N tracking targets, the N first tracking boxes configured to frame the N tracking targets of the first image, and N is an integer greater than 1;

an image synthesis unit 402 configured to superimpose and synthesize the first image and the second image, to obtain a target image;

a feature extraction unit 403 configured to input the target image into an hourglass network model for feature extraction, to output a target feature map;

a data determination unit 404 configured to input the target feature map into a prediction network, to output a thermodynamic diagram, a width and height value set, a minor deviation value set and a feature vector set; and a tracking unit 405 configured to determine N second tracking boxes based on the thermodynamic diagram, the width and height value set, the minor deviation value set, the feature vector set and the N first tracking boxes; wherein the N second tracking boxes are configured to frame the N tracking targets of the second image.

In an implementation of the present disclosure, the prediction network includes a thermodynamic diagram branch, a width and height branch, a minor deviation branch and a feature vector branch; in terms of inputting the target feature map into the prediction network, to output the thermodynamic diagram, the width and height value set, the minor deviation value set and the feature vector set, the data determination unit 404 specifically configured to:

input the target feature map into the thermodynamic diagram branch, to output the thermodynamic diagram; input the target feature map into the width and height branch, to output the width and height value set; and input the target feature map into the minor deviation branch, to output the minor deviation value set; and input the thermodynamic diagram and the minor deviation value set into the feature vector branch, to output the feature vector set.

In an implementation of the present disclosure, in terms of determining the N second tracking boxes based on the thermodynamic diagram, the width and height value set, the minor deviation value set, the feature vector set and the N first tracking boxes, the tracking unit 405 specifically configured to:

determine second positions of N second center points based on the thermodynamic diagram, the minor deviation value set, the feature vector set and first positions of N first center points, wherein the N first center points are center points of the N first tracking boxes, the N second center points are center points of the N second tracking boxes, and the N first positions are in one-to-one correspondence with the N second positions;

determine a second height of the N second tracking boxes and a second width of the N second tracking boxes based on the width and height value set, a first height of the N first tracking boxes, and a first width of the N first tracking boxes; wherein the second height of the N second tracking boxes is in one-to-one correspondence with the first height of the N first tracking boxes, and the second width of the N second tracking boxes is in one-to-one correspondence with the first width of the N first tracking boxes.

In an implementation of the present disclosure, the target feature map includes M feature points, and M is a positive integer; in terms of determining the second positions of the N second center points based on the thermodynamic diagram, the minor deviation value set, the feature vector set, and the first positions of N the first center points, the tracking unit 405 specifically configured to:

determine third positions of N target feature points in the target feature map based on the thermodynamic diagram, and determining offsets of the N target feature points based on the minor deviation value set, wherein the N target feature points are in one-to-one correspondence with the N first central points and the N second central points, the target feature point is a midpoint of a connection line between the corresponding first central point and the corresponding second central point, the M feature points including the N target feature points, and the offset configured to represent the corresponding target feature point shifted relative to a position that the corresponding target feature point is in the target feature map;

determine a first mapping relationship based on the N first positions, and the N third positions that have determined, the first mapping relationship configured to represent at least one target feature point corresponding to each first central point; and determine the second positions of the N second center points based on the feature vector set, the N first positions, the first mapping relationship, N offsets that have determined, and the N third positions.

In an implementation of the present disclosure, in terms of superimposing and synthesizing the first image and the second image, to obtain the target image, the image synthesis unit 402 specifically configured to:

determine a first color channel of the first image and a second color channel of the second image; and synthesize the target image by superimposing the first color channel and the second color channel.

In an implementation of the present disclosure, the hourglass network model is formed by sequentially arranging i hourglass networks, wherein an input image of an i-th hourglass network is an image obtained by synthesizing an input image and an output image of a (i−1)-th hourglass network, and i is an integer greater than or equal to 2;

performing a first processing every time when passing through one of the hourglass networks, wherein, in the first processing, the input image is down-sampled through a plurality of first convolution blocks of the hourglass network, to output a first feature map; the first feature map is up-sampled through a plurality of second convolution blocks of the hourglass network, to output a second feature map; superimposing the second feature map and the input image, to output a third feature map.

It should be noted that all the information obtaining unit 401, the image synthesis unit 402, the feature extraction unit 403, the data determination unit 404 and the tracking unit 405 can be implemented by a processor.

A computer readable storage medium according to an embodiment of the present disclosure is provided. The computer readable storage medium is configured to store computer programs for electronic data interchange performed by a computer to implement some or all steps of the multi-target tracking method which is described in the electronic device of the present disclosure.

A computer program product according to an embodiment of the present disclosure includes a non-transient computer readable storage medium. The non-transient computer readable storage medium is configured to store computer programs performed by a computer to implement some or all steps of the multi-target tracking method which is described in the electronic device of the present disclosure. The computer program product can be a software installation package.

The steps of the method or algorithms described in the embodiments of the present disclosure can be implemented by means of hardware or by means of a processor to perform software instructions. The software instructions can be composed of corresponding software modules that are stored in a Random Access Memory (RAM), a flash Memory, a Read Only Memory (ROM), an Erasable Programmable ROM (EPROM), an Electrically Erasable Programmable ROM (EEPROM), a register, a hard disk, a removable disk, a compact disc Read only Memory (CD-ROM), or any other forms of storage mediums known in the art. An exemplary storage medium is coupled to the processor so that the processor can read information from the storage medium, and write information to the storage medium. Of course, the storage medium can also be integrated with the processor. The processor and the storage medium can be embedded in an ASIC. In addition, the ASIC can be arranged in an access network device, a target network device, or a core network device. Of course, the processor and the storage medium can also be as discrete components that are arranged in the access network device, the target network device or the core network device.

What is claimed is:

1. A multi-target tracking method applied to an electronic device and comprising:

obtaining a first image and a second image from the same target video file, and obtaining N first tracking boxes of the first image; wherein the first image is an image that precedes the second image by a preset number of frames, each of the first image and the second image comprising N tracking targets, the N first tracking boxes configured to frame the N tracking targets of the first image, and N is an integer greater than 1;

superimposing and synthesizing the first image and the second image, to obtain a target image;

inputting the target image into an hourglass network model for feature extraction, to output a target feature map;

inputting the target feature map into a prediction network, to output a thermodynamic diagram, a width and height value set, a minor deviation value set and a feature vector set; and determining N second tracking boxes based on the thermodynamic diagram, the width and height value set, the minor deviation value set, the feature vector set and the N first tracking boxes;

wherein the N second tracking boxes are configured to frame the N tracking targets of the second image.

2. The method as claimed in claim 1, wherein the prediction network comprises a thermodynamic diagram branch, a width and height branch, a minor deviation branch and a feature vector branch; the step of inputting the target feature map into the prediction network, to output the thermodynamic diagram, the width and height value set, the minor deviation value set and the feature vector set, comprising:

inputting the target feature map into the thermodynamic diagram branch, to output the thermodynamic diagram; inputting the target feature map into the width and height branch, to output the width and height value set; and inputting the target feature map into the minor deviation branch, to output the minor deviation value set; and inputting the thermodynamic diagram and the minor deviation value set into the feature vector branch, to output the feature vector set.

3. The method as claimed in claim 1, wherein the step of determining the N second tracking boxes based on the thermodynamic diagram, the width and height value set, the minor deviation value set, the feature vector set and the N first tracking boxes, comprises:

determining second positions of N second center points based on the thermodynamic diagram, the minor deviation value set, the feature vector set and first positions of N first center points, wherein the N first center points are center points of the N first tracking boxes, the N second center points are center points of the N second tracking boxes, and the N first positions are in one-to-one correspondence with the N second positions; and determining a second height of the N second tracking boxes and a second width of the N second tracking boxes based on the width and height value set, a first height of the N first tracking boxes, and a first width of the N first tracking boxes; wherein the second height of the N second tracking boxes is in one-to-one correspondence with the first height of the N first tracking boxes, and the second width of the N second tracking boxes is in one-to-one correspondence with the first width of the N first tracking boxes.

4. The method as claimed in claim 3, wherein the target feature map comprises M feature points, and M is a positive integer; the step of determining the second positions of the N second center points based on the thermodynamic diagram, the minor deviation value set, the feature vector set, and the first positions of the N first center points, comprising:

determining third positions of N target feature points in the target feature map based on the thermodynamic diagram, and determining offsets of the N target feature points based on the minor deviation value set, wherein the N target feature points are in one-to-one correspondence with the N first central points and the N second central points, the target feature point is a midpoint of a connection line between the corresponding first central point and the corresponding second central point, the M feature points comprising the N target feature points, and the offset configured to represent the corresponding target feature point shifted relative to a position that the corresponding target feature point is in the target feature map;

determining a first mapping relationship based on the N first positions, and the N third positions that have determined, the first mapping relationship configured to represent at least one target feature point corresponding to each first central point; and determining the second positions of the N second center points based on the feature vector set, the N first positions, the first mapping relationship, N offsets that have determined, and the N third positions.

5. The method as claimed in claim 1, wherein the step of superimposing and synthesizing the first image and the second image, to obtain the target image, comprises:

determining a first color channel of the first image and a second color channel of the second image; and synthesizing the target image by superimposing the first color channel and the second color channel.

6. The method as claimed in claim 1, wherein the hourglass network model is formed by sequentially arranging i hourglass networks, wherein an input image of an i-th hourglass network is an image obtained by synthesizing an input image and an output image of a (i-1)-th hourglass network, and i is an integer greater than or equal to 2;

performing a first processing every time when passing through one of the hourglass networks, wherein, in the first processing, the input image is down-sampled through a plurality of first convolution blocks of the hourglass network, to output a first feature map; the first feature map is up-sampled through a plurality of second convolution blocks of the hourglass network, to output a second feature map; superimposing the second feature map and the input image, to output a third feature map.

7. A multi-target tracking device applied to an electronic device, the electronic device comprising a processor and a memory and one or more computerized program units stored in the memory, the one or more computerized program units comprising instructions performed by the processor of the electronic device, the units and comprising:

an information obtaining unit performed by the processor and configured to obtain a first image and a second image from the same target video file, and obtain N first tracking boxes of the first image; wherein the first image is an image that precedes the second image by a preset number of frames, each of the first image and the second image comprising N tracking targets, the N first tracking boxes configured to frame the N tracking targets of the first image, and N is an integer greater than 1;

an image synthesis unit performed by the processor and configured to superimpose and synthesize the first image and the second image, to obtain a target image;

a feature extraction unit performed by the processor and configured to input the target image into an hourglass network model for feature extraction, to output a target feature map;

a data determination unit performed by the processor and configured to input the target feature map into a prediction network, to output a thermodynamic diagram, a width and height value set, a minor deviation value set and a feature vector set; and a tracking unit performed by the processor and configured to determine N second tracking boxes based on the thermodynamic diagram, the width and height value set, the minor deviation value set, the feature vector set and the N first tracking boxes; wherein the N second tracking boxes are configured to frame the N tracking targets of the second image.

8. The device as claimed in claim 7, wherein the hourglass network model is formed by sequentially arranging i hourglass networks, wherein an input image of an i-th hourglass network is an image obtained by synthesizing an input image and an output image of a (i-1)-th hourglass network, and i is an integer greater than or equal to 2;

performing a first processing every time when passing through one of the hourglass networks, wherein, in the first processing, the input image is down-sampled through a plurality of first convolution blocks of the hourglass network, to output a first feature map; the first feature map is up-sampled through a plurality of second convolution blocks of the hourglass network, to output a second feature map; superimposing the second feature map and the input image, to output a third feature map.

9. An electronic device comprising a processor, a memory, a communication interface, and one or more programs stored in the memory and performed by the processor, the programs comprising instructions for performing s a multi-target tracking method, the method comprising:

obtaining a first image and a second image from the same target video file, and obtaining N first tracking boxes of the first image; wherein the first image is an image that precedes the second image by a preset number of frames, each of the first image and the second image comprising N tracking targets, the N first tracking boxes configured to frame the N tracking targets of the first image, and N is an integer greater than 1;

superimposing and synthesizing the first image and the second image, to obtain a target image;

inputting the target image into an hourglass network model for feature extraction, to output a target feature map;

inputting the target feature map into a prediction network, to output a thermodynamic diagram, a width and height value set, a minor deviation value set and a feature vector set and determining N second tracking boxes based on the thermodynamic diagram, the width and height value set, the minor deviation value set, the feature vector set and the N first tracking boxes; wherein the N second tracking boxes are configured to frame the N tracking targets of the second image.

\* \* \* \* \*